United States Patent [19]

Angel

[11] Patent Number: 5,383,332
[45] Date of Patent: Jan. 24, 1995

[54] GAS TURBINE ENGINES

[75] Inventor: Robert G. Angel, Farnham, United Kingdom

[73] Assignee: British Aerospace plc, London, England

[21] Appl. No.: 68,479

[22] Filed: Jun. 19, 1987

[30] Foreign Application Priority Data

Jun. 21, 1986 [GB] United Kingdom ............... 8615184

[51] Int. Cl.$^6$ ............................................ F02K 1/00
[52] U.S. Cl. ...................................... 60/228; 60/225; 60/226.2
[58] Field of Search ............ 60/228, 204, 226.2, 60/225

[56] References Cited

U.S. PATENT DOCUMENTS

| 4,010,608 | 3/1977 | Simmons | 60/226.3 |
| 4,175,384 | 11/1979 | Wajenknecht | 60/226.3 |
| 4,552,309 | 11/1985 | Szuminski | 60/228 |

*Primary Examiner*—Donald P. Walsh
*Attorney, Agent, or Firm*—Cushman, Darby & Cushman

[57] ABSTRACT

A variable cycle gas turbine bypass engine includes a first fan 1 located at an inlet to the engine so as to provide air to a compressor 2 driven by a turbine 11 and to a bypass duct 13 surrounding the compressor housing. A second fan 5 located in the bypass duct 13 is driven by a free turbine 12. A controllable area auxiliary air intake 4 and bypass duct blocker doors 3 are located between the first and second fans 1, 5. Control means are effective for selectably operating the bypass duct blocker doors 3 and the auxiliary air intake 4 to vary in operation the bypass ratio of the engine. Thus in conventional wing-borne flight, the intake 4 is closed and the bypass duct 13 is unobstructed, and the combined exhausts from the bypass duct 13 and the turbines 10, 11 and 12 pass to a tailpipe 14, which has a vectorable nozzle 8, to produce forward thrust. In jet-borne flight, however, the doors 3 block the bypass duct 13, the auxiliary air intake 4 is opened to admit air to the second fan 5, and a vectorable nozzle 9 with associated blocker doors 3a and the nozzle 8 are operated by the control means respectively to receive air from the first fan 1 and the exhausts from the second fan 5 and the turbines 10, 11 and 12.

14 Claims, 3 Drawing Sheets

GAS TURBINE ENGINES

The present invention relates to gas turbine engines.

It is an object of the present invention to provide a variable cycle gas turbine bypass engine for an aircraft in which the ratio between the quantity of air bypassing the engine's primary combustion chamber or chambers to the quantity of air passing through the combustion chamber(s), conventionally referred to as the bypass ratio, may be maximised for low forward speeds of the aircraft and controllably optimised for high subsonic, transonic and supersonic flight.

The invention may be most advantageously applied to vectored thrust gas turbine engines for aircraft designed for short take-off and vertical landing (STOVL) applications.

In one known proposal for a STOVL aircraft, described briefly in Aviation and Space Technology, Apr. 21st, 1986 at pages 54 and 55, a tandem fan engine includes a forward transfer duct extension to a bypass turbine engine including a forward fan driven by an extended shaft driving the conventional bypass fan. In wing-borne flight the two fans operate to provide bypass and compressor inlet air flows in an otherwise conventional manner. In jet-borne flight, that is to say, during that portion of the aircraft's flight in which lift is provided wholly or partially by the jet engine, an auxiliary air inlet system located between the two fans opens and a shut-off valve in the air stream aft of the front fan but forward of the auxiliary air inlet closes. Air from the front fan is then diverted downward by the shut-off valve through a burner to a nozzle below the transfer duct. The remainder of the engine is then supplied with air from the auxiliary inlet.

In a modified form of the known proposal, and also mentioned in the same reference article, a hybrid fan design comprises a tandem fan arrangement in which the shut-off valve is replaced by a rotary type diverter valve. The forward single nozzle is replaced by a pair of unaugmented thrust vectoring nozzles.

Both of the known proposals described above give rise to problems in any practical embodiment. The extended shaft carrying the extra fan must be capable of handling considerable loads and load variations caused by the transition from wing-borne to jet-borne flight. Hence it must be made in a thick and heavy form with a consequent weight penalty for the aircraft to which it is attached. Moreover, the elongated engine increases drag and requires increased thrust to achieve desired airspeeds. Because a single turbine drives both fans on a common shaft no independent compensation for the difference in air throughput of both fans during jet-borne flight appears possible.

It is one object of the present invention to overcome the disadvantages of these proposals.

It is also an object of the present invention to provide a variable cycle vectored thrust aircraft engine operating at low jet dynamic pressures and low jet temperatures in jet-borne flight. It is a feature of the invention that the above objects may be attained using conventional gas turbine engine components in a novel arrangement.

According to the present invention in one aspect thereof a variable cycle gas turbine bypass engine includes a first fan located at an inlet to the engine so as to provide air to a compressor and to a bypass duct surrounding a housing for said compressor, said compressor being connected to be driven by a turbine in a turbine section of the engine, a second fan located in said bypass duct connected to be driven by a turbine, a controllable area auxiliary air intake and bypass duct blocker means located between said first and said second fans, and control means for selectably operating said bypass duct blocker means and said auxiliary air intake to vary in operation the bypass ratio of the engine for optimum performance appropriate to prevailing operating conditions.

According to the present invention in another aspect thereof a variable cycle vectorable thrust gas turbine bypass engine includes a first fan located at an inlet to the engine so as to provide air to a compressor and to a bypass duct surrounding a housing for said compressor and connected to be driven by a turbine in a turbine section of the engine, a second fan located in said bypass duct connected to be driven by a turbine, first bypass duct blocker means located in said bypass duct between said first and said second fans, at least one rotatable vectorable nozzle and associated second blocker means located between said first and said second fans for selectably deflecting compressed air from said first fan into a desired direction, an auxiliary air intake to the bypass duct between said first and said second fans, and control means for selectably operating said blocker means and said at least one vectorable nozzle so as to select an engine configuration suitable for: either aerodynamic wing-borne flight in which the said second fan acts as an additional compression stage for air in the bypass duct which has been subjected to an initial compression by said first fan, and bypass and turbine exhaust streams pass to at least one outlet nozzle; or jet-borne flight in which said bypass duct is blocked upstream of the said second fan and air compressed by the said first fan is directed via a said vectorable nozzle in a desired direction and bypass and turbine exhaust streams are directed via another of said rotatable vectoring nozzles or via a vectoring form of said outlet nozzle.

The fans may be single-stage or multi-stage fans and the compressor may be a single-stage or a multi-stage high pressure compressor.

In one embodiment of the invention, the bypass duct blocker means are arranged to close said auxiliary air intake in the aerodynamic wing-borne configuration of the engine and to block the bypass duct and open the auxiliary air intake in the jet-borne configuration of the engine.

In a further embodiment of the invention, independent first and second turbines are arranged to drive said first and second fans, respectively. The turbine for driving the second fan is preferably a free turbine.

In a further embodiment of the invention a translateably displaceable plug or flow restrictor is located in an exhaust outlet of the turbine section of the engine and the control means are arranged to move the said plug so as to increase the area of this exhaust outlet when the engine is in its jet-borne configuration and to reduce the area of the exhaust outlet when the engine is in its wing-borne flight configuration.

Two embodiments of the invention suitable for a STOVL aircraft will now be described, by way of example only, with reference to the accompanying drawings, in which.

In the following description engine components which are substantially the same in each of the drawings are given common reference numbers.

In this specification the term '3-post engine' is defined as a vectorable thrust engine provided with three emergent jets on which the aircraft is supported in jet-borne flight and, correspondingly, the term '4-post engine' indicates an engine having four emergent jets on which the aircraft is supported during jet-borne flight.

Figure 1:
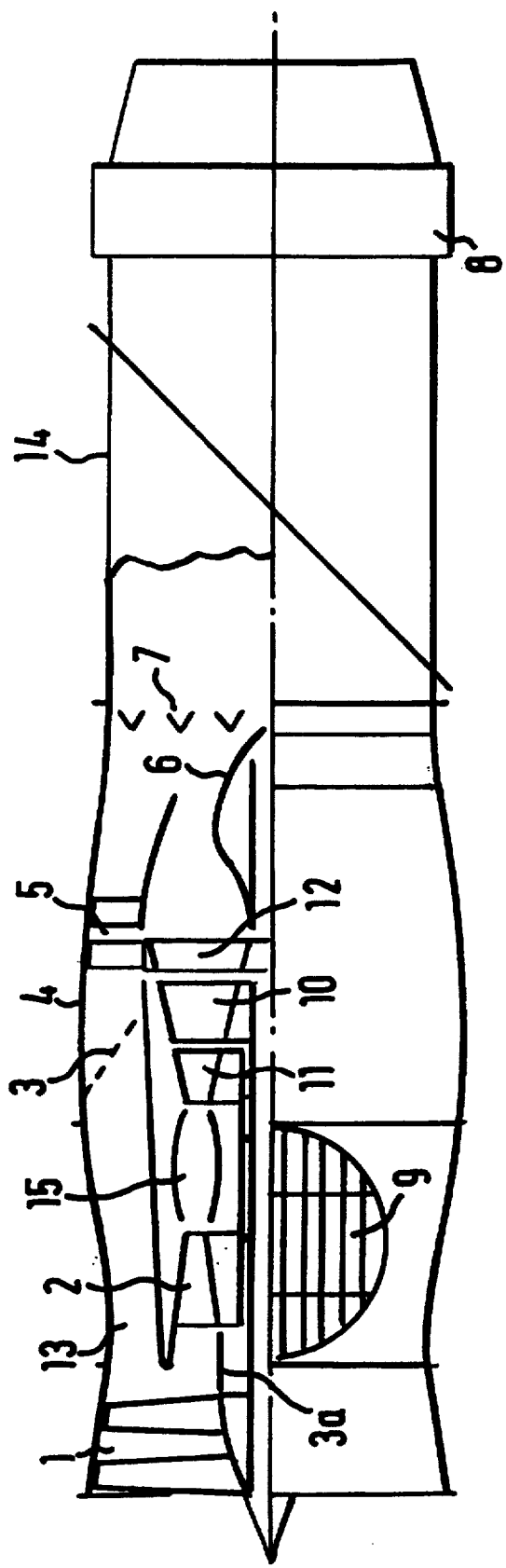
FIG. 1 is a part-sectional schematic view of a '3-post' version of a variable cycle vectored thrust engine according to a first embodiment of the invention.

FIG. 1 shows a variable cycle vectorable thrust engine comprising essentially a conventional two-spool bypass engine having a multi-stage bypass fan 1 at its inlet and connected to be driven by an independent turbine 10, a high-pressure compressor 2 connected to be driven by an independent turbine 11, a primary combustion chamber or chambers 15, an after-burner 7, two rotating cascade vectorable nozzles 9 and a vectorable variable area nozzle 8 on a tailpipe 14. The engine further includes a second bypass fan 5 driven by a free turbine 12 and located in the bypass duct 13, bypass duct blocker doors 3, an auxiliary air intake 4 and a translating plug or restrictor 6 located in the outlet of the turbine section of the engine.

Figure 2:
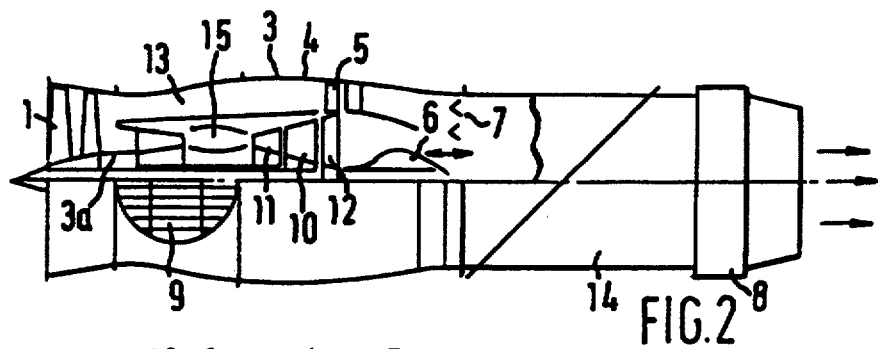
FIG. 2 is a part-sectional view of the engine of FIG. 1 configured for wing-borne flight.

In operation, in conventional wing-borne flight the engine of FIG. 1 is configured by a control means (not shown) to the configuration shown in FIG. 2. The auxiliary air intake 4 is closed by bypass duct blocker doors 3 and the translating plug 6 is located in a forward position defining a relatively narrow outlet from the turbine section of the engine. The final vectorable nozzle 8 is aligned with the fore and aft axis of the engine so that axial thrust is produced by the engine. In this configuration the second bypass fan 5 provides an additional compression stage for the bypass airstream in the bypass duct 13 which has previously been compressed at the fan 1. The bypass and turbine exhaust streams pass to the final nozzle 8 via the afterburner 7 in the conventional manner.

Figure 3:
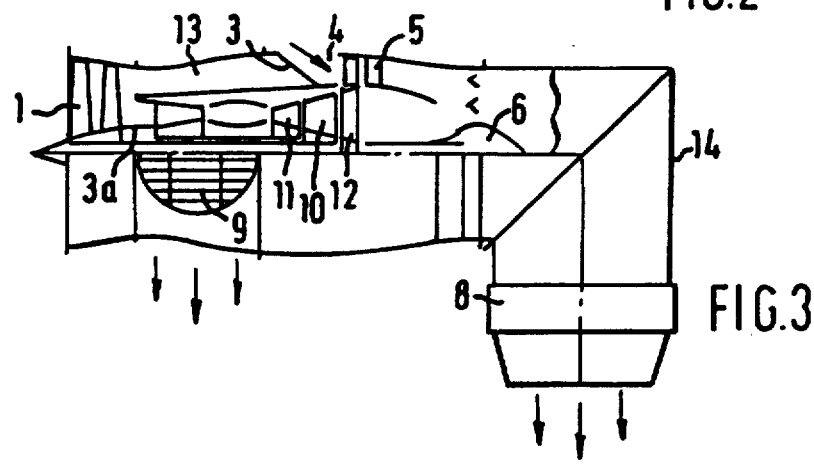
FIG. 3 is a part-sectional view of the engine of FIG. 1 configured for jet-borne flight.

FIG. 3 shows the engine configured by the control means (not shown) for jet-borne flight. In this configuration the bypass duct 13 is blocked upstream of the second bypass fan 5 by the blocker doors 3 which also serve to open the auxiliary air intake 4 so as to admit auxiliary air to the second bypass fan 5. Blocker doors 3a to the front rotating cascading type vectorable nozzles 9 are opened in this configuration and the air compressed by the front fan 1 exhausts through the cascades in the direction of the arrow, providing two of the 'posts' of the 3-post arrangement. Ambient air is admitted to the second bypass fan 5 via auxiliary air intake 4 in the bypass duct 13 and the nozzle area downstream of the turbine section of the engine is increased by moving the translating plug 6 aft. Since the back pressure on the turbine 12 is reduced, its expansion ratio and hence power output is increased. In addition, the fuel flow to the combustion chamber(s) 15 may also be increased, thus giving an overall further increase in cycle power output.

The aft fan 5 and turbine 12 exhausts pass out through the final nozzle 8 which is configured vertically by the control means to provide the third post of the 3-Post arrangement.

Figure 5:
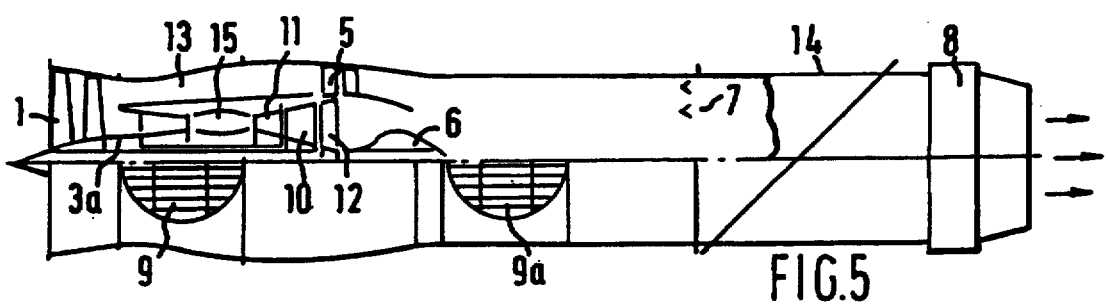
FIG. 5 is a part-sectional view of the engine of FIG. 4 configured for wing-borne flight.
Figure 6:
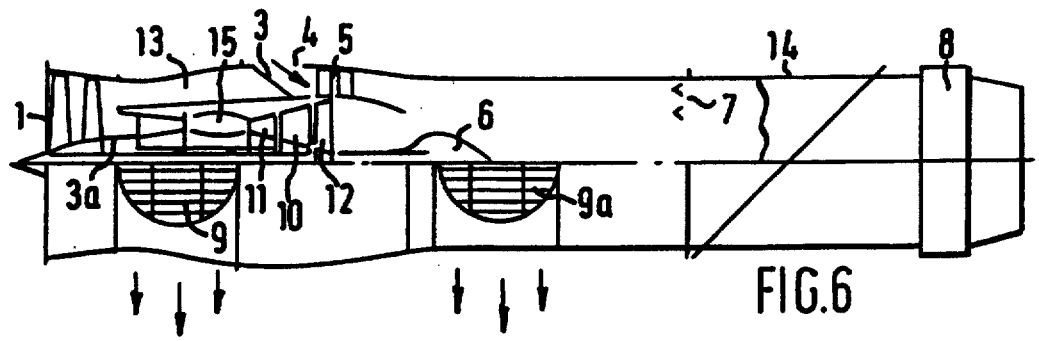
FIG. 6 is a part-sectional view of the engine of FIG. 4 configured for jet-borne flight.
Figure 4:
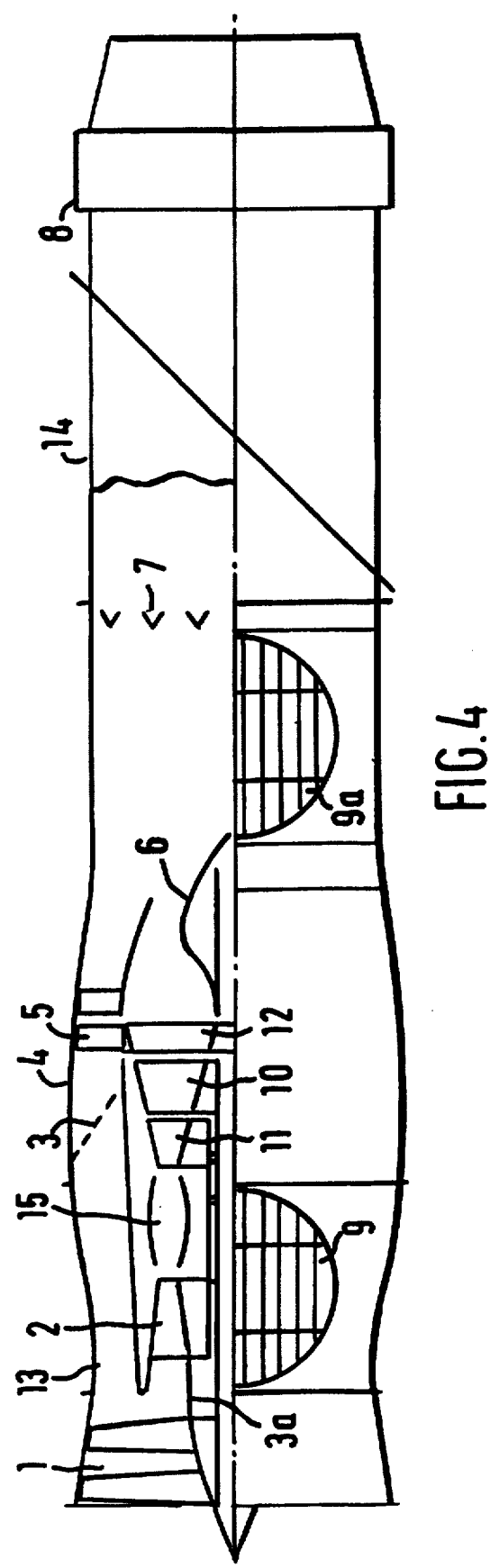
FIG. 4 is a part-sectional view of a '4-post' version of a variable cycle vectored thrust engine according to a second embodiment of the invention.

A 4-post embodiment of an engine according to the invention is shown in FIG. 4. FIGS. 5 and 6 show the 4-post version of the engine of FIG. 4 in wing-borne and jet-borne configurations, respectively. In the 4-post embodiment an additional pair of rotating cascade type vectorable nozzles 9a are located downstream of the second bypass fan 5. In jet-borne flight these nozzles are uncovered by doors (not shown) which shut off flow to the tailpipe 14.

Many modifications and variations of the embodiments shown in FIGS. 1 to 3 and 4 to 6, respectively, will now suggest themselves to those skilled in the art. For example, elbow type vectorable nozzles could be used instead of the rotating cascade type vectorable nozzles 9.

The second bypass fan 5 could be connected to turbine 10 or turbine 11 of the basic gas generator core engine rather than to an independent turbine 12.

The translating plug 6 could be dispensed with. The afterburner 7 is also optional.

The second bypass fan 5 could be preceded in the bypass duct 13 by variable incidence inlet guide vanes and/or the blades of the fan 5 itself could be variable pitch blades, such variable incidence and/or variable pitch blades being controlled by the control means so as to vary the loading on the second bypass fan 5.

The vectorable nozzles 9 could be provided with plenum chamber burners and/or a thrust augmenter could be included in the bypass duct aft of the second bypass fan 7 to enhance thrust in jet-borne flight.

A re-heat arrangement could be provided in which an extra combustion chamber or chambers could be located between turbines 10, 11 driving the compressor 2 of the basic gas generator and the first bypass fan 1 and turbine 12. In this way further flexibility of control of the second bypass fan 5 could be achieved.

It will be appreciated that although embodiments of the invention suitable for a STOVL aircraft have been described above, many embodiments of the invention may be devised which will be suitable for conventional jet aircraft having no VTOL or STOVL capability. In the latter embodiments the provision of vectorable nozzles will not, of course, be required but the facility to vary the bypass ratio of the engine by means of the second aft fan and its associated blocker door and auxiliary air intake will be retained to provide optimum engine efficiency in the various parts of the total flight envelope, e.g. take off, subsonic, transonic, supersonic and landing, that the aircraft may be required to perform.

I claim:

1. A variable cycle gas turbine bypass engine, comprising:
   a main ambient air inlet and an outlet;
   a compressor disposed between said main inlet and said outlet;
   a housing for said compressor;
   a bypass duct currounding said housing;
   a first fan located at said inlet to the engine and effective to provide air to said compressor and to said bypass duct;

a turbine section including a turbine for driving said compressor;

a controllable area auxiliary ambient air intake located in said bypass duct downstream of said inlet;

a second fan located in said bypass duct downstream of said auxiliary air intake and connected to be driven by a turbine in said turbine section;

bypass duct blocking means located in said bypass duct between said first and said second fans; and control means for selectably operating said bypass duct blocking means and said auxiliary air intake to vary in operation the bypass ratio of the engine.

2. An engine as claimed in claim 1, wherein vectorable nozzle means and associated (second) blocking means are disposed between said first fan and said second fan for selectively deflecting compressed air from said first fan into a desired direction.

3. An engine as claimed in claim 1, wherein vectorable nozzle means and associated (second) blocking means are disposed between said first fan and said second fan for selectively deflecting compressed air from said first fan into a desired direction, and additional vectorable nozzle means are connected to receive gases exhausted from said turbine section, the control means being effective in use to control the vectoring movement of, and flow of exhaust gases to, said additional nozzle means.

4. An engine as claimed in claim 1, wherein the said outlet of the engine is provided with a vectorable tailpipe nozzle.

5. An engine as claimed in claim 1, wherein vectorable nozzle means and associated (second) blocking means are disposed between said first fan and said second fan for selectively deflecting compressed air from said first fan into a desired direction, said control means being effective selectably to configure said engine for aerodynamic wing-borne flight and for jet-borne flight;

wherein, for aerodynamic wing-borne flight the said bypass duct blocking means and said second blocking means are inoperative so as to leave the bypass duct unobstructed to permit said second fan to act as an additional compression stage for air compressed by the first fan and bypass and turbine exhaust streams to pass to said outlet; and wherein, for jet-borne flight, said bypass duct blocking means and said at least one vectorable nozzle means are operated to block the bypass duct so as to direct air compressed by said first fan via a said nozzle means in a desired direction and to direct turbine exhaust and bypass exhaust to said outlet.

6. An engine as claimed in claim 1, wherein first vectorable nozzle means and associated (second) blocking means are disposed between said first fan and said second fan for selectably deflecting compressed air from said first fan into a desired direction; second vectorable nozzle means are connected to receive gases exhausted from said turbine section, the control means being effective in use to control the vectoring movement of, and flow of exhaust gases to, said first and second additional nozzle means;

wherein, for aerodynamic wing-borne flight the said bypass duct blocking means and said second blocking means are inoperative so as to leave the bypass duct unobstructed to permit said second fan to act as an additional compression stage for air compressed by the first fan and bypass and turbine exhaust streams to pass to said outlet; and wherein, for jet-borne flight, said bypass duct blocking means, said at first vectorable nozzle means and said second vectorable nozzle means are operated by said control means to block the bypass duct so as to direct air compressed by said first fan via the first nozzle means, to direct turbine exhaust via said second vectorable nozzle means, and to direct turbine and bypass exhaust to said outlet.

7. An engine as claimed in claim 1, wherein first vectorable nozzle means and associated (second) blocking means are disposed between said first fan and said second fan for selectably deflecting compressed air from said first fan into a desired direction; second vectorable nozzle means are connected to receive gases exhausted from said turbine section, and wherein the said outlet of the engine is provided with vectorable tailpipe nozzle means; said control means being effective in use to control the vectoring movement of, and flow of exhaust gases to, said first, second and tailpipe nozzle means;

wherein, for aerodynamic wing-borne flight the said bypass duct blocking means and said second blocking means are inoperative so as to leave the bypass duct unobstructed to permit said second fan to act as an additional compression stage for air compressed by the first fan and bypass and turbine exhaust streams to pass to said outlet; and wherein, for jet-borne flight, said bypass duct blocking means, said first and said second vectorable nozzle means and said vectorable tailpipe nozzle means are operated by said control means to block the bypass duct so as to direct air compressed by said first fan via the said first vectorable nozzle means, to direct turbine exhaust via said second vectorable nozzle means, and to direct turbine and bypass exhaust to said outlet, via said vectorable tailpipe nozzle means.

8. An engine as claimed in claim 1, wherein the turbine for driving said second fan is a free turbine located to be driven by the exhaust gases from said turbine section.

9. An engine as claimed in claim 1, wherein the turbine for driving said second fan is the turbine connected to drive said compressor.

10. An engine as claimed in claim 1, wherein the turbine for driving said second fan is the turbine connected to drive said first fan.

11. An engine as claimed in claim 1, wherein an axially displaceable flow cross-section restrictor is disposed downstream of the turbine for driving said second fan.

12. An engine as claimed in claim 1, wherein vectorable nozzle means and associated (second) blocking means are disposed between said first fan and said second fan for selectively deflecting compressed air from said first fan into a desired direction, said control means being effective selectably to configure said engine for aerodynamic wing-borne flight and for jet-borne flight; the turbine for driving said second fan being the turbine connected to drive said compressor, and an axially displaceable flow cross-section restrictor is disposed downstream of the turbine for driving said second fan; said control means being arranged in use to displace said restrictor in a direction to increase the outlet flow cross-section of the turbine section for said jet-borne engine configuration and to reduce it for said wing-borne engine configuration.

13. An engine as claimed in claim 1, wherein variable incidence inlet guide vanes are disposed in said bypass duct upstream of said second fan.

14. An engine as claimed in claim 1, wherein the blades of said second fan are variable pitch blades.

* * * * *